Jan. 27, 1970     H. FOLKERTS     3,492,019
TRACTOR WEIGHTS
Filed Feb. 3, 1969
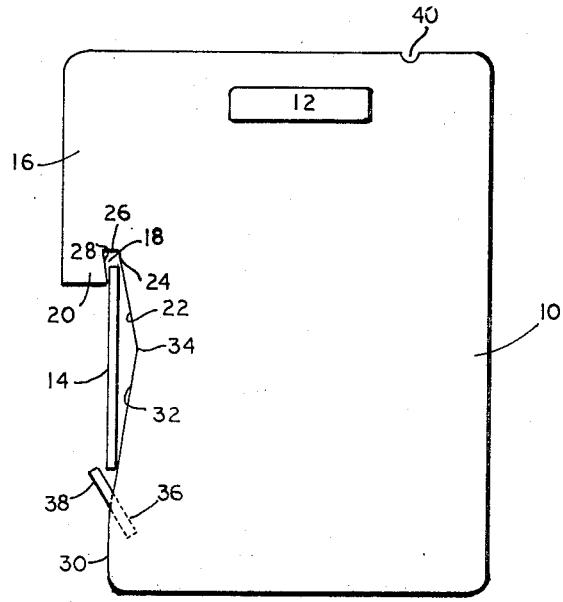
FIG. 1
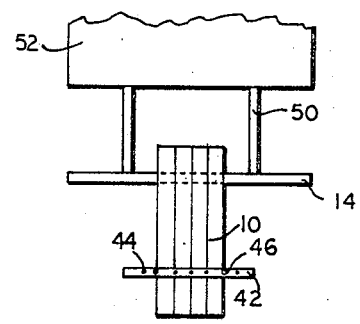
FIG. 4
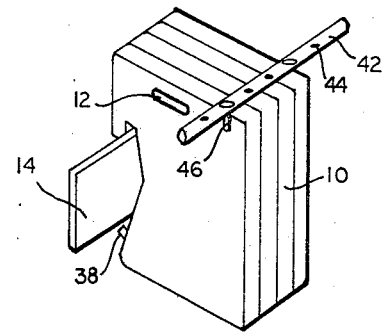
FIG. 3
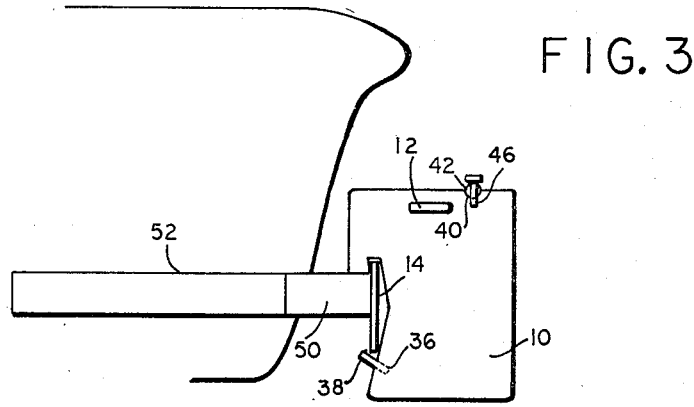
FIG. 2
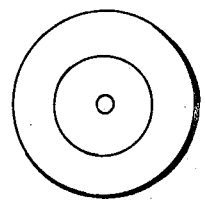
*INVENTOR.*
HENRY FOLKERTS
BY *Lindenberg & Freilich*
ATTORNEYS.

United States Patent Office 3,492,019
Patented Jan. 27, 1970

3,492,019
TRACTOR WEIGHTS
Henry Folkerts, Granger, Wash., assignor to Folkert, Incorporated, Grandview, Wash., a corporation of Washington
Filed Feb. 3, 1969, Ser. No. 796,028
Int. Cl. B60r 27/00
U.S. Cl. 280—150                    13 Claims

ABSTRACT OF THE DISCLOSURE

A counterweight for a tractor is disclosed. A set of weights is adapted to be inserted onto a rectangular cross section weight support bar which may be the tractor bumper. Each weight has a rearward extension including an upwardly converging slot and a bearing protrusion disposed on the rear face of the weight below the slot. The bar is inserted into the slot and the weight bears against the forward and rearward walls of the slot and against the protrusion to form a stable three point contact with the bar.

BACKGROUND OF THE INVENTION

Field of the invention

The present invention relates to a tractor counterweight and more particularly to a set of such weights adapted for mounting in any desired number on a tractor bumper or weight-mounting bracket.

Description of the prior art

An agricultural tractor is utilized to perform various tasks throughout the year which demand different power requirements and affect the weight distribution between the front and rear wheels of the tractor. It has been customary to design the tractor having a weight distribution adequate for normal and light duty operations and to add detachable or removeable ballast weights to the rear or the front of the vehicle to aid with traction and braking, to improve stability of a tractor mounted with heavy implements or operating on uneven ground and to provide added steering stability for the vehicle according to the demands of the particular operation.

The detachable or removeable weights have taken many different forms such as adding liquid to the tires, weight discs to the wheel axles weight boxes to the front end of the tractor or various forms of individual weights which are supported on outwardly extending pins or rest on horizontal brackets or on the bumper of the tractor. The present trend in the agricultural industry is to standardize accessory equipment so that the farmer is not burdened with the purchase of a whole new line of accessories each time he desires to purchase a tractor from a different manufacturer. The most convenient and popular type of front-end weight is known as the "Suitcase Weight" which is in the form of a generally rectangular iron casting having a lip which extends over the tractor bumper or a specially provided weight bracket. However, these weights have a tendency to fall off during motion of the tractor which has required the use of separate fasteners to hold the weights in place on the bracket or bumper. The fastening operation increases the complexity and cost of the weight assembly and adds a further operation when adding or removing weights from the tractor.

OBJECTS AND SUMMARY OF THE INVENTION

It is therefore an object of this invention to provide detachable front-end tractor counterweights which are readily attached and removed from a tractor vehicle.

A further object of the invention is to provide an improved, easily handled, readily fabricated suitcase type of weight that is readily attached to a tractor weight bracket or a bumper without requirement of a mechanical fastener to hold the weight in place.

Yet another object of the invention is to provide a counterweight adapted to be utilized in sets to be arranged side by side on a tractor mounting bracket.

A still further object of the invention is the provision of an improved, easily manipulated, suitcase weight which can be individually handled when it is being attached or detached from a tractor vehicle.

These and other objects and many attended advantages of the invention will become apparent as the description proceeds.

In accordance with the invention an improved, detachable vehicle counterweight comprises a weight member typically formed of a dense material such as steel or iron adapted to be readily inserted by a simple motion onto a tractor bumper or if required specially mounted weight support bar. The weight, designed to be utilized in series with others of the same configuration, comprises a generally rectangular member having an upwardly converging bar receiving slot opening from the bottom face of a top-rear extension of the weight member. The bottom rear face is provided with a bar bearing means preferably extending into the plane of said opening. The bar is inserted into the slot and bears against said bearing means and the weight is firmly and stably supported in three-point contact with the bar.

The invention will now become better understood by reference to the following detailed description when considered in conjunction with the accompanying drawings.

BRIEF DESCRIPTION OF THE DRAWINGS

FIGURE 1 is a side plan view of an individual counterweight according to the invention;

FIGURE 2 is a side elevational view of the counterweight assembly shown in schematic attachment to the front end of a conventional tractor;

FIGURE 3 is a front perspective view of an assembly of the weight unit; and

FIGURE 4 is a top view of an assembled weight unit.

DESCRIPTION OF THE PREFERRED EMBODIMENTS

Referring now to FIGURE 1 of the drawings each individual detachable weight unit comprises a generally rectangular steel or iron member suitably about 2 to 5 inches thick, about 12 to 20 inches long and about 10–15 inches wide such that each unit weighs about 50 to a hundred pounds so that they are readily individually handled. To add to the convenience in handling a cutout 12 may be provided a few inches from the top to act as a grip or handle.

The weight member 10 is adapted to be inserted onto a rectangular cross-section tractor or weight support bar 14 suitably a ½ inch thick by 6 inches wide bar which is of a length adapted to receive a desired number of weight members. Each weight member 10 includes a portion 16 extending rearwardly along the top rearward face of the member. A slot 18 extends upwardly from the bottom face 20 of the extension 16. The forward wall 22 diverges toward the opening 24 of the slot such that the opening is wider than the thickness of the bar 14 and the width of the slot decreases gradually toward the upward end 26 thereof. The rearward wall 28 of the slot 18 may converge slightly toward the opening 24.

The rear face of the weight member extends downwardly from the opening a length at least equal to the remaining length of bar 14. To facilitate assembly the bottom portion 30 of the rear face is relieved to an extent such that the face of the portion 30 is within the plane of the opening 24 of the recess. A further portion 32 of the rear face intermediate the bottom portion 30 and the recess is relieved in the form of a slanted plane extending upwardly and forwardly from a point within the plane of the opening 24 to a point 34 outside of the plane opening 24. The diverging face 22 of the slot 18 intersects with the slanted face 32 at point 34.

The weight unit member 10 of the invention may further include upward movement restraining means and sideward movement restricting means. In one form the restraining means according to the invention comprises a recess 36 slanting forwardly and downwardly along the bottom portion 32 of the rear face and is adapted to receive a pin 38 which will extend outward from the weight unit 10 and will contact the bottom edge of the weight supporting bar 14. The sideway movement restricting means simply takes the form of a slot 40 provided along the top forward edge of each weight member 10.

Referring now to FIGURES 2 to 4 the slot 40 is adapted to be utilized in conjunction with an adjustable clamp such as rod 42 having a series of bores 44 spaced the width of a weight unit 10 from each other. The rod 42 rests in the slot 40 and pins 46 are inserted into the first set of exposed holes at each end of the set of weight units. The bottom portion of each pin acts as a restricting arm to prevent sideways movement of the series of weights.

In the assembly of the selective and adjustable counterweight unit of the invention a weight supporting member 14 is mounted by members 50 to the chassis 52 of a tractor at a sufficient extension from the radiator or body 54 to provide clearance to insert the weight units 10 over the top edge of the weight support bar 14. The weight unit is grasped in the grip 12 and is placed over the top edge of the bar 14 and by its own weight is allowed to seat by permitting bar 14 to enter the opening 24 of the slot 18 and bind against the forward wall 22 and the rearward wall 28 thereof. Simultaneously the bar will engage a point along the slanted relief portion 32 of the bottom portion of the rear face to provide a stable three point contact between the two walls of the slot 18 and the wall 32. A pin 38 may then be inserted into a slot 36.

A plurality of weight units 10 are inserted onto support bar 14 side by side in the manner described. After a suitable number of units have been inserted to provide the desired weight compensation the restricting rod 42 is laid in the continuous slot formed by the alignment of the individual slots 40 and pins 46 are inserted into the first exposed bores 44 at each end of the rod 42. The weight unit is now assembled and the tractor may be operated over various terrain without fear of the units separating from the support bar by lateral or by vertical movement.

The simple and direct configuration of the weight unit of the invention permits fabrication by casting iron or steel or by flame cutting a blank of mild steel. This has the advantage of simplicity of operation and mild steel is substantially denser than cast iron and is not subject to brittle fracture should one of the units be dropped. The wedge shaped binding forces of the slot and cooperatively disposed bottom portion of the rear face provide a natural, inherent extremely effective and stable attachment of the weight units without the necessity of mechanically fastening the unit which requires the use of special tools and is still liable to loosen when subjected to the vibrations during operation over rough terrain.

It is to be understood that only preferred embodiments of the invention have been disclosed and that numerous substitutions, alterations or modifications may be effected by one skilled in the art without departing from the scope of the invention.

What is claimed is:

1. A tractor counterweight adapted for direct, manual, installation or removal from a horizontal counterweight supporting bar attached to a tractor comprising:
   a counterweight member having a generally rectangular shaped main body portion;
   a lip portion projecting rearwardly from an upper part of the rear end face of the body portion;
   an upwardly-converging bar-engaging slot being defined between said portions extending upwardly from the bottom edge of said lip portion, a portion of the rear end face of the body portion forming the forward wall of said slot, said wall diverging toward the opening of said slot such that the width at the opening of the slot is greater than the thickness of said bar.

2. A counterweight according to claim 1 in which the width of said slot at the upper end thereof is less than the thickness of said bar.

3. A counterweight according to claim 2 in which the rearward wall of said slot converges slightly toward said opening.

4. A counterweight according to claim 1 further including bearing means on said rear end face of said body portion below said lip portion for bearing against said bar.

5. A counterweight according to claim 4 in which said bearing means comprises a portion of the lower rear end face of said body extending into the plane of said opening.

6. A counterweight according to claim 5 in which said bearing means comprises a relieved portion of said rear end face which slants forwardly from a point within the plane of the opening to a second point without the plane of the opening and said slanted, relieved portion intersecting said diverging forward wall of the slot at said second point.

7. A counterweight according to claim 1 further including means for destraining upward movement of said counterweight member.

8. A counterweight according to claim 7 in which said restraining means comprises a downwardly extending pin receiving recess positioned on the lower rear face of said body below said bearing means.

9. A counterweight according to claim 1 wherein each counterweight weighs 50 to 100 pounds and is 2 to 5 inches thick, 10 to 15 inches wide and 12 to 20 inches long.

10. A counterweight according to claim 1 further including means for restricting sideward movement of said members inserted on said bar.

11. A counterweight according to claim 10 in which said restricting means comprises a recess provided in the top face of said member and an elongated weight clamp comprising a bar resting in said recess having downwardly extending end members.

12. A counterweight according to claim 11 in which means are provided for positioning said end members along said bar.

13. A variable counterweight assembly comprising in combination:
   a motorized vehicle;
   a horizontally disposed weight support bar;
   means extending from said vehicle for mounting said bar; and
   a plurality of weight members having a substantially rectangular body, a rearward extension projecting from the upper portion of the rear face of the body, said extension defining an upwardly converging slot and said weight members including a bearing protrusion along the lower rear face thereof, said members being inserted side by side onto said bar and said bar bearing against said protrusion and against the forward and rear walls of said slot to form a stable three-point contact with each of said weight members.

References Cited

UNITED STATES PATENTS

| | | |
|---|---|---|
| 1,785,119 | 12/1930 | Gorsuch. |
| 2,701,728 | 2/1955 | Miller. |
| 3,338,541 | 8/1967 | Kellogg _____ 248—243 |

LEO FRIAGLIA, Primary Examiner

R. R. SONG, Assistant Examiner